EDWARD F. UNDERHILL.

Improvement in Vine Locks.

No. 115,662.  
Patented June 6, 1871.

115,662

UNITED STATES PATENT OFFICE.

EDWARD F. UNDERHILL, OF BROCTON, NEW YORK.

IMPROVEMENT IN VINE-LOCKS.

Specification forming part of Letters Patent No. 115,662, dated June 6, 1871; antedated May 30, 1871.

*To all whom it may concern:*

Be it known that I, EDWARD F. UNDERHILL, of Brocton, in the county of Chautauqua in the State of New York, have invented a certain new and Improved Vine-Lock; and I do hereby declare that the following is a full and exact description thereof.

By a vine-lock I mean a cheap device for connecting vines, or the shoots therefrom, to trellises of wire or other slender material.

My present invention can be made very rapidly and cheaply by machinery, and possesses marked advantages over any before known to me. Letters Patent issued to me on the 1st of December, 1868, described a vine-lock having hooks standing in opposite directions, and adapted to be connected with and disconnected from a trellis-wire by merely changing its position without bending any part thereof; I have found this my present invention superior.

I will proceed to describe what I consider the best means of carrying out my invention, and will afterward designate the points which I believe to be new. The accompanying drawing forms a part of this specification.

Figure 1:
Figure 3:
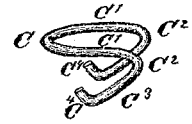
Figure 2:
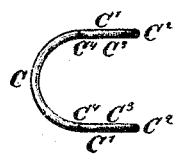
Figure 4:
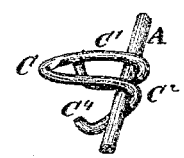
Figure 5:
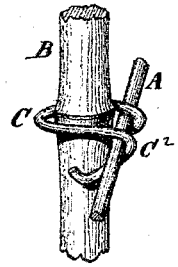
Figure 6:
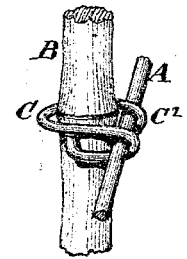

Figure 1 is a side view of the vine-lock as made and sold ready for transportation and application. It is in an inverted position. Fig. 2 is a top view corresponding. Fig. 3 is a perspective view corresponding. Fig. 4 is a perspective view of the vine-lock when fully and permanently attached to a trellis-wire. Fig. 5 represents the same with a stout shoot inclosed. Fig. 6 represents the hook on what may termed the right side, closed. These figures (4 and 5) represent the hook on what may be termed the left side, closed. Either may be closed according to fancy, but it is important that only one is closed.

In large vineyards alternate rows may be hooked on opposite sides to vary the action of the muscles in the work of hooking—that is to say, first, one row may be provided, as in Fig. 5, and then the next may be provided as in Fig. 6, it being understood that the hook not shown in Fig. 6 is left open so as to only loosely take hold of the trellis-wire.

Similar letters of reference indicate corresponding parts in all the figures.

I take common iron wire as the cheapest and most available material, about No. 16, Birmingham gage, and, preferably employing machinery which will be briefly described below, bend it in the form represented. I will indicate the several parts by separate letters.

C is a semicircular curved part, adapted to loosely embrace a vine or shoot of the ordinary size. $C^1 C^1$ are straight portions extending parallel to each other from the ends of the curved part C. $C^2 C^2$ are short bends, and $C^3 C^3$ are straight portions continuing from the bends $C^2$. $C^4 C^4$ are terminal points. This constitutes the whole of the vine-lock in its simplest form.

It may be covered with leather or analogous material within the curvature of the part C; or it may be placed in a mold, and lead or analogous material cast upon it to give it breadth, to afford a wide bearing for the vine; or it may be employed to inclose between itself and the vine bits of rag, felt, or various other materials; but I will now describe it in its simplest form as a naked wire.

The figures indicate the manner in which the improved vine-lock is applied upon the wire of a trellis, and secured by being bent at one of the points, $C^2$, with pliers or otherwise.

A is one of the horizontal wires of a trellis. In those cases where stakes without extended wires are employed for training the vines the letter A may represent a nail, or a staple, or a piece of wire driven horizontally into the side of the stake.

B is a section of a grape-vine which it is desired to train thereto.

In applying the vine-lock I embrace the shoot or vine within the curved portion C, and hook the bent arms of the vine-lock on the wire with the hooks downward; then, bending up one of the arms $C^3$, the connection is made permanent until it shall be again opened by a reversion of the process. Thus the vine is held securely in its position on the trellis or stake until the annual pruning is done, at which time the vine is cut closely to the vine-lock and is thus disengaged, leaving the vine-lock to remain securely suspended to the wire by the closed slot for use for many seasons.

I claim—

The within-described vine-lock, adapted to be permanently attached to the trellis-wire or its equivalent and to allow the vine to be engaged and removed, as herein set forth.

In testimony whereof I have hereunto set my name in presence of two subscribing witnesses.

EDWARD F. UNDERHILL.

Witnesses:
CHARLES T. DUNWELL,
FRED. E. UNDERHILL.